Dec. 16, 1941. F. M. REID 2,266,264
TRACTOR-TRAILER BRAKING SYSTEM
Filed March 7, 1940
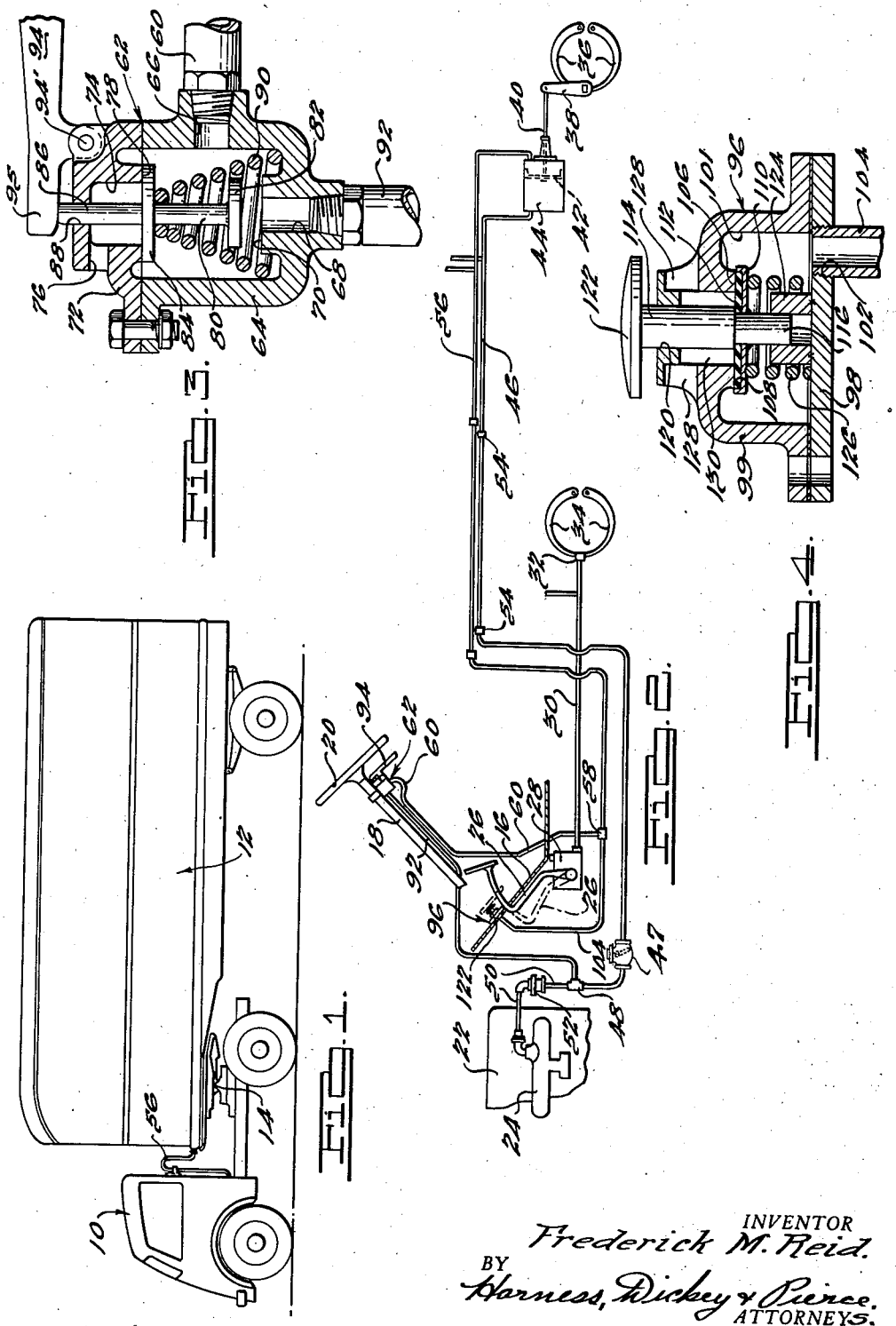
INVENTOR
Frederick M. Reid.
BY Harness, Dickey & Pierce.
ATTORNEYS.

Patented Dec. 16, 1941

2,266,264

UNITED STATES PATENT OFFICE 2,266,264

TRACTOR-TRAILER BRAKING SYSTEM

Frederick M. Reid, Detroit, Mich., assignor to Fruehauf Trailer Company, Detroit, Mich., a corporation of Michigan Application March 7, 1940, Serial No. 322,723

4 Claims. (Cl. 188—3)

The present invention relates to a braking system for automotive vehicles and particularly to such a system for tractor-trailer automotive vehicles.

One of the primary objects of the present invention is to provide a braking system of the type mentioned, in which an hydraulically operated brake is used on the tractor and a vacuum brake is used on the trailer, in which in the event of failure of the hydraulic brake, the vacuum brake is automatically and instantly operated to brake the trailer.

A further object of the invention is to provide a braking system of the type mentioned in which an automatic safety means, which is associated with the trailer vacuum brake, is positioned in the path of movement of the foot pedal of the hydraulic tractor brake, so that in the event of failure of the hydraulic brake when the foot pedal is depressed, such foot pedal automatically and instantly actuates the safety means when it approaches its fully depressed position to set the vacuum brakes on the trailer.

Other objects of the invention will become apparent from the following specification, the drawing relating thereto and from the claims hereinafter set forth.

In the drawing, in which like numerals are used to designate like parts in the several views throughout:

Figure 1 is a side elevational view of the type of tractor-trailer automotive vehicle having the braking system of the present invention applied thereto;

Fig. 2 is a diagrammatic view of a braking system according to the present invention as applied to the vehicle illustrated in Fig. 1;

Fig. 3 is an enlarged cross-sectional view, with parts in elevation, of one type of a valve structure, illustrated in Fig. 2, which may be used to manually operate the vacuum brake; and, Fig. 4 is an enlarged cross-sectional view, with parts in elevation, of an automatically operated valve, illustrated in Fig. 2, positioned in the path of the foot pedal of the hydraulic tractor brake.

In tractor-trailer vehicle constructions, hydraulic brakes are often used on the tractor and vacuum brakes used on the trailer. It has been found that the hydraulic brakes sometimes fail particularly in emergencies when the foot pedal is depressed with unusual force. This sometimes results in blowing the communicating line to the hydraulic brake, in which event the brake does not take hold and is obviously then useless. While the vacuum brakes could then be manually operated, it will be appreciated that there would be a lapse of time before the operator realized that the hydraulic brakes had failed and before he could manually operate the vacuum brake on the trailer.

According to the present invention, an automatic means is positioned in the path of the foot pedal so that in the event that the hydraulic brake fails and the foot pedal is then depressed to its full position, signifying such failure, the foot pedal abuts against the automatic means which instantly operates the vacuum brake on the trailer to brake the trailer. Such automatic means is independent of the manual operating means for the vacuum brake so that such manual means need not be operated to set the vacuum brake.

For a better understanding of the invention, reference may be had to the drawing in which a tractor of conventional construction is generally indicated at 10, having a semi-trailer, generally indicated at 12, releasably connected thereto in the usual way through a fifth wheel connection, indicated at 14.

The usual floor board 16 is disposed within the cab of the tractor, having the usual steering column 18 and steering wheel 20 mounted therein. An automotive engine 22 is mounted on the tractor and may be either of the type in which the engine is mounted under the seat or may be mounted forwardly of the driver's compartment. The engine 22 has the usual intake manifold 24 associated therewith.

A conventional hydraulic braking system is mounted on the tractor and is operated by a foot pedal 26 in the usual way. The foot pedal 26 projects above the floor board 16 and is operatively connected to a conventional hydraulic brake master cylinder 28. A fluid conduit 30 is connected to the master cylinder 28 in the usual way and is connected through suitable conduits to conventional operating means 32, which are operatively associated with the tractor brakes 34. Such tractor brakes 34 are operatively connected to the tractor wheels in the usual way and are preferably of the internal expanding type, although other types may be used, if desired.

It will be appreciated that when the foot pedal 26 is depressed, the brake shoes 34 expand to set the brakes on the tractor.

A conventional vacuum brake system is provided for the trailer and includes internal expansible brake shoes 36 which are operatively associated with the wheels of the tractor in the usual way. Such shoes 36 are operated by a lever arm 38, which is operatively connected to the shoes and which is actuated by a piston shaft 40, which in turn is connected to a reciprocable piston 42 reciprocably mounted within a vacuum cylinder 44. One of such cylinders and brakes with the operative connections therebetween is, of course, provided for each of the tractor wheels.

The opposite ends of the cylinder 44 are both in communication with the intake manifold 24, so that when both lines are in such communication with the intake manifold, a balanced condition results and the brake 36 is not applied.

The front end of cylinder 44 is connected through a vacuum conduit 46 through a T-connection 48 with conduits 50. A conventional check valve 47 is disposed in conduit 46 between the cylinder 44 and the T-connection 48. Such conduits 50 have the usual check valve 52 inserted therein and communicate with the intake manifold 24. Also, the usual tractor-to-trailer couplings 54 are provided in the conduit 46 so that the conduit 46 may be separated when the tractor and trailer are separated from each other.

The rear end of cylinder 44 has a vacuum line 56 associated therewith which communicates with the interior of the cylinder 44. Such conduit 56 communicates through a T-connection 58 with another vacuum conduit member 60. Such member 60 extends upwardly adjacent the steering column 18 and communicates with a trailer brake control valve, generally indicated at 62, which is mounted on the steering column 18 adjacent the wheel 20.

The valve 62 comprises a housing 64 with a port 66 through one side wall thereof and another port 68 in the bottom wall thereof. A valve seat 70 is formed on the inner side of port 68 for a purpose that will be hereinafter described.

A cap 72 is secured to the top of housing 64 and is formed with a downwardly opening chamber 74 which communicates with the interior of the housing 64. A port 76 is formed in the cap 72 communicating with the chamber 74 and opening to the atmosphere for a purpose that will be hereinafter described. Another annular valve seat 78 is formed in the cap 72 adjacent the lower edge of chamber 74. A valve 80 is reciprocably disposed within the housing 64 and has a lower disk valve 82 adapted to seat on valve seat 70, and has an upper disk valve 84 adapted to seat on valve seat 78. The valve disks 82 and 84 are integrally connected and an upstanding integral stem 86 is formed on the valve 84. The stem 86 extends through the chamber 74 and through a guide opening 88 formed in the top of the cap 72 and projects upwardly therebeyond. The opening 88 is of sufficient depth to serve as a guide for the stem 86 and for the valve 80.

The valve 80 is urged to its upper position by means of a spiral spring 90, so that the valve 84 bears against the valve seat 78. Such spiral spring bears against the lower end of the chamber within housing 64 around port 68 with the upper end of the spring bearing against the under surface of valve 84. It will thus be seen that the ports 66 and 68 are normally in communication with each other with the port 76 normally closed from communication with the interior of housing 64.

The conduit 60 communicates with the interior of housing 64 through port 66 and another conduit member 92 communicates with the interior of the housing through port 68. The conduit member 92 is placed in communication with the intake manifold through its connection with the T-connection 48.

It will thus be seen that with the valve parts in the position shown in Fig. 3, both ends of the cylinder are in communication with the intake manifold, and the vacuum brakes are not applied when the elements are in this position.

In order to apply the vacuum brakes, an operating lever 94 is pivotally connected at 94' to the cap 72 of valve 62. Such lever 94 has a projecting portion 95 which overlies the upwardly projecting stem 86 and bears thereagainst. When it is desired to apply the vacuum brake, the lever 94 is raised by the operator so that the stem 86 is depressed. This causes the valve 82 to seat on the valve seat 70, thereby shutting off communication with the intake manifold, and at the same time causes the valve 84 to unseat, thereby communicating the interior of the housing with the atmosphere through chamber 74 and port 76. The conduits 60 and 56 are thereby communicated with the atmosphere and the piston 42 is caused to move toward the front of cylinder 44, thereby applying the brake 36.

The structure so far described is conventional structure in use on tractor-trailer automotive vehicles. As mentioned above, in the event of failure of the hydraulic brake on the tractor, a distinct manual operation is required to apply the vacuum brake on the trailer. As such hydraulic brake failures usually occur when an excessive force is applied to the brakes in an emergency, it will be appreciated that there is not sufficient time to manually apply the vacuum brakes under such circumstances.

According to the present invention, an automatic emergency means is provided which will be instantly applied by the brake pedal 26 in the event that the hydraulic brake fails. Such emergency means includes a valve, generally indicated at 96, which includes a base plate 98, having a housing 99 connected to one face thereof, thereby forming a chamber 101. The valve 96 is mounted on the floor board 16 slightly forwardly of the pedal 26 so that the valve is in the path of movement of the foot pedal as such foot pedal is depressed. An aperture 102 is provided through the base 98 and has a conduit member 104 connected with the base through such aperture so that the conduit communicates with the chamber 101. The other end of the conduit 104 communicates with the T-connection 58 and, therefore, with the conduit 56.

The housing 99 is formed with a depending valve seat 106, which is adapted to have a valve 108 seat thereagainst. The valve 108 preferably includes a metal disk member 110 provided with a peripheral flange with a resilient member 112 of complementary shape secured to the top thereof. The resilient member 112, which may be of rubber, thereby provides a seal against valve seat 106, when the valve 108 is in its normal upward position. A valve stem 114 is connected to the valve 108, by welding a lower projecting end 116 to the member 110, for example. The valve stem 114 projects upwardly through a guide opening 120 formed in the top of housing 99 and has an integral button or top 122 formed in the top end thereof in spaced relation to the top of housing 99. The lower end 116 is slidably received within a guide collar 124, which is suitably secured to the base 98. A spring 126 embraces the collar 124 and bears against the under surface of valve 108 to normally urge such valve upwardly to its sealing position against valve seat 106.

Ports 128 are provided in the housing 99 and communicate with a chamber 130 surrounding the pin 114 and thereby communicating with the chamber 101 when the valve 108 is unseated. When the valve is unseated, it will be appreciated that the conduit 104 is vented to the atmosphere through port 128 and chamber 130. It will also be appreciated that when the conduit 104 is vented to the atmosphere, the conduit 56 is likewise vented to the atmosphere and the vacuum brake is thereby applied.

In the operation of the structure above described, it will be seen that in the event that the hydraulic brake fails, the pedal 26 is then pressed to its fully depressed position as the result of such failure. The foot engaging portion of the brake pedal then strikes against the button 122, as indicated by the broken lines in Fig. 2, thereby causing the valve stem 114 to be depressed, unseating the valve 108. The conduit 104 is then instantly vented to the atmosphere and the vacuum brake is instantly and automatically applied. This operation is entirely independent of the manual operation of valve 62, so that the trailer vacuum brakes are applied without any need for manual operation of the valve 62.

It will be appreciated that the detailed description of the present invention is directed to those skilled in the vehicle brake art and is merely illustrative; and that those skilled in the art will readily appreciate that changes in pipe or conduit sizes or vent opening sizes, or the like, to obtain different braking effects are merely matters of commercial design.

Formal changes may be made in the specific embodiment of the invention described without departing from the spirit and substance of the invention, the scope of which is commensurate with the appended claims.

What is claimed is:

1. In a braking system for tractor-trailer automotive vehicles wherein an hydraulic brake structure is operatively associated with the tractor and is operated by a foot pedal in the tractor, and a vacuum brake structure is operatively associated with the trailer and is normally controlled by manual means in the tractor, said vacuum brake structure being of the type which is normally balanced by vacuum on opposite sides of an operating element and which is operated to set the brakes by venting one side to pressure, the combination with means mounted on the tractor and associated with the foot pedal and with said vacuum brake, said means being operable when said pedal approaches its fully depressed position to thereby automatically operate said vacuum brake.

2. In a braking system for tractor-trailer automotive vehicles wherein an hydraulic brake structure is operatively associated with the tractor and is operated by a foot pedal in the tractor, and a vacuum brake structure is operatively associated with the trailer and is normally controlled by manual means in the tractor, said vacuum brake structure being of the type which is normally balanced by vacuum on opposite sides of an operating element and which is operated to set the brakes by venting one side to pressure, the combination with means mounted within the tractor in the path of movement of the foot pedal and associated with said vacuum brake, said means being operable by said pedal when said pedal approaches its fully depressed position, to thereby automatically operate said vacuum brake.

3. A braking system for tractor-trailer automotive vehicles wherein an hydraulic brake structure is operatively associated with the tractor and is operated by a foot pedal in the tractor, and a vacuum brake structure is operatively associated with the trailer and is normally controlled by manual means in the tractor, said vacuum brake structure being of the type which is normally balanced by vacuum on opposite sides of an operating element and which is operated to set the brakes by venting one side to pressure, the combination with valve means mounted within the tractor in the path of movement of the foot pedal, means communicating said valve means with the vacuum brake on the trailer, said valve being operable by said foot pedal when said foot pedal approaches its fully depressed position to vent the communicating means to the atmosphere and thereby automatically set said vacuum brake in braking position.

4. In a braking system for tractor-trailer automotive vehicles having an intake manifold associated with the automotive engine wherein an hydraulic brake structure is operatively associated with the tractor and is operated by a foot pedal in the tractor and wherein a vacuum brake structure having two conduits communicating with the manifold is operatively associated with the trailer, one of which conduits is in constant communication with the manifold and the other is in communication with the manifold through a manually controlled vent valve located in the tractor, the arrangement being such that both conduits are in communication with the manifold when the vacuum brake is not applied and being such that the brake is applied by manually operating the manually controlled valve to vent said other of the conduits with the atmosphere, the combination with valve means mounted within the tractor in the path of movement of the foot pedal, said valve means communicating with said other of the conduits and having a port adapted to communicate said other of the conduits with the atmosphere when said valve means is contacted by said foot pedal as said foot pedal approaches its fully depressed position in the event of failure of said hydraulic brake structure, thereby automatically setting said vacuum brake in braking position.

FREDERICK M. REID.